(12) United States Patent
Desai et al.

(10) Patent No.: US 11,451,987 B2
(45) Date of Patent: Sep. 20, 2022

(54) CHANNEL AVAILABILITY CHECK OPTIMIZATION

(71) Applicant: Cisco Technology, Inc., San Jose, CA (US)

(72) Inventors: Vishal Satyendra Desai, Milpitas, CA (US); Edgard Vangeel, Heusden-Zolder (BE); Jerome Henry, Pittsboro, NC (US); Robert E. Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 9 days.

(21) Appl. No.: 17/148,640

(22) Filed: Jan. 14, 2021

(65) Prior Publication Data

US 2022/0225131 A1   Jul. 14, 2022

(51) Int. Cl.
  *H04W 24/00* (2009.01)
  *H04W 24/06* (2009.01)
  *H04W 88/08* (2009.01)

(52) U.S. Cl.
  CPC ............ *H04W 24/06* (2013.01); *H04W 88/08* (2013.01)

(58) Field of Classification Search
  CPC .............................. H04W 24/06; H04W 88/08
  See application file for complete search history.

(56) References Cited

U.S. PATENT DOCUMENTS

| | | | | |
|---|---|---|---|---|
| 11,283,475 | B1 * | 3/2022 | Tsai | ...................... H04W 28/20 |
| 2015/0063321 | A1 | 3/2015 | Sadek et al. | |
| 2017/0041954 | A1 | 2/2017 | Tsai et al. | |
| 2017/0063665 | A1 | 3/2017 | Casebolt et al. | |
| 2017/0150368 | A1 | 5/2017 | Ngo et al. | |
| 2017/0188293 | A1 * | 6/2017 | Mizusawa | ............. H04W 16/14 |
| 2018/0014205 | A1 | 1/2018 | Tsai et al. | |
| 2019/0246324 | A1 * | 8/2019 | Cizdziel | ................ H04W 36/06 |
| 2019/0364598 | A1 * | 11/2019 | Ringland | .............. H04W 16/14 |
| 2020/0187082 | A1 | 6/2020 | Boehlke et al. | |

FOREIGN PATENT DOCUMENTS

| CN | 107820253 A | 3/2018 |
|---|---|---|
| JP | 2020126082 A | 8/2020 |

OTHER PUBLICATIONS

International Search Report and Written Opinion issued in corresponding International Patent Application No. PCT/US2022/012140, dated Apr. 22, 2022.

* cited by examiner

*Primary Examiner* — Hashim S Bhatti
(74) *Attorney, Agent, or Firm* — Merchant & Gould P.C.

(57) ABSTRACT

Channel availability check optimization may be provided. A plurality of Pulse Repetition Intervals (PRIs) may be determined for a respective plurality of bursts on a respective plurality of frequencies. A list of at least a portion of the plurality of frequencies may be generated. The list may include a plurality of bias factors respectively indicating a probability that each of the respective plurality of bursts was a radar burst based on the respective plurality of PRIs. An Access Point (AP) may perform a plurality of preemptive Channel Availability Checks (CACs) on each of the respective plurality of frequencies on the list in order of highest probability to lowest probability based on the plurality of bias factors.

20 Claims, 4 Drawing Sheets

| DFS_Frequency | TDWR | Classifier Bias Factor | Ephemeral_PoP | Preemptive_CAC |
|---|---|---|---|---|
| 5600 | Y | 0.9478 | | Completed |
| 5620 | Y | 0.9312 | 0.220 μs | Completed |
| 5640 | Y | 0.9188 | | Completed |
| 5720 | | 0.9516 | | Completed |
| 5260 | ..... | 0.9132 | ..... | In Progress |
| ..... | ..... | ..... | ..... | ..... |
| 5300 | | 0.8597 | 0.387 μs | Scheduled |

FIG. 4

CHANNEL AVAILABILITY CHECK OPTIMIZATION

TECHNICAL FIELD

The present disclosure relates generally to channel availability check optimization.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a separate device, but it can also be an integral part of the router itself. APs may operate together in a coordinated manner, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver wired network access to all of the network-enabled devices in the building. With the creation of the wireless AP, network users are able to connect devices that access the network with few or no cables. An AP normally connects directly via a wired Ethernet connection to the network and the AP allows other client devices to share that wired connection using radio frequency links. Most APs support the connection of multiple wireless devices to one wired connection. APs are designed to support an industry standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 4 illustrates a second table; and

DETAILED DESCRIPTION

Overview

Figure 1:
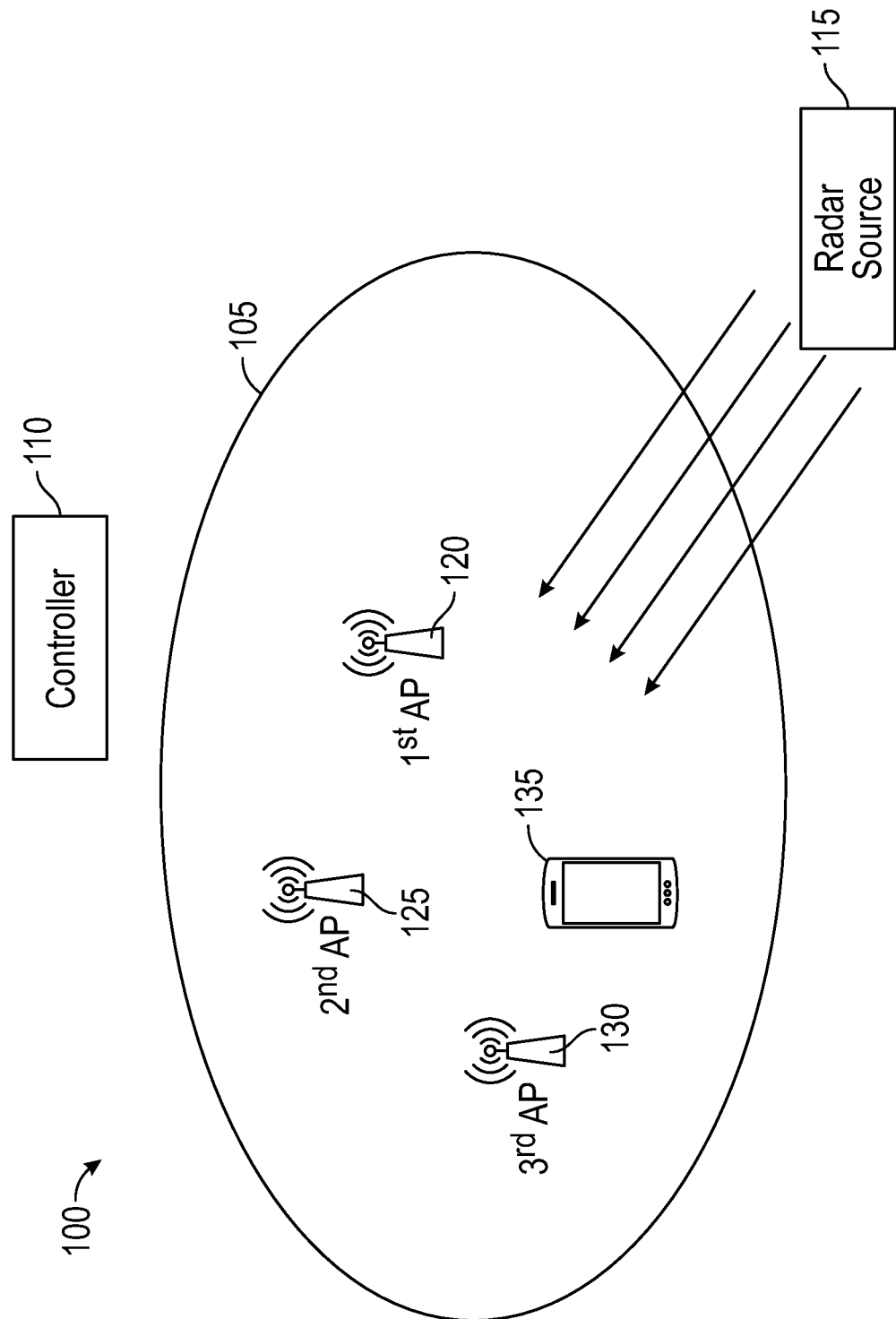
FIG. 1 is a block diagram of an operating environment for providing channel availability check optimization.

Channel availability check optimization may be provided. A plurality of Pulse Repetition Intervals (PRIs) may be determined for a respective plurality of bursts on a respective plurality of frequencies. A list of at least a portion of the plurality of frequencies may be generated. The list may include a plurality of bias factors respectively indicating a probability that each of the respective plurality of bursts was a radar burst based on the respective plurality of PRIs. An Access Point (AP) may perform a plurality of preemptive Channel Availability Checks (CACs) on each of the respective plurality of frequencies on the list in order of highest probability to lowest probability based on the plurality of bias factors.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A portion of the Wi-Fi spectrum (e.g., 5 GHz) falls within a set of frequencies that overlap with radar operations. Therefore, in order to have Wi-Fi operate on those frequencies, a wireless AP may implement a Dynamic Frequency Selection (DFS) process as mandated by regulations. A Channel Availability Check (CAC) function may comprise an element of the DFS process. A CAC may ensure that a radio spends enough time monitoring a channel prior to having any transmissions on it. CAC enables better sharing of Wi-Fi with radiodetermination services (e.g., radar frequency incumbents) within the frequency spectrum. This situation is present in almost all countries world-wide, however due to the lack of Unlicensed National Information Infrastructure 3 (UNI-3) availability, countries that adopted standards developed by the European Telecommunications Standards Institute (ETSI) have more than 75% of the spectrum requiring DFS bound to the CAC function. This percentage may increase as the channel width supports higher bandwidth.

For most DFS channels, the CAC function may need to last at least 60 seconds to detect radar, however, a segment of the DFS frequencies used by Terminal Doppler Weather Radar (TDWR) (or other Meteorological Radar) mandates a much longer CAC, for example, 600 seconds. This longer CAC is mandatory prior to any transmissions on these frequencies. However, switching to a channel and to have no transmissions for that long (while the CAC is being performed) may results in a significant impact to network operations and loss of functionality. Therefore, even though TDWR (or other Meteorological Radar) channels are allowed, WLAN vendors may avoid operation on these channels. This, however, may reduce the number of available channels for Wi-Fi. Accordingly, there may be a need for a method to limit the effect of the CAC function on these channels while maintaining compliance so as to re-enable operations on these affected channels. Leveraging standards from ETSI EN 301 893 that may be mandated by regulations, embodiments of the disclosure may provide a process that institutes an Intelligent Channel Availability Check Avoidance Engine (ICAE) that may maximize the validity of a preemptive CAC within its legal boundaries enlisted by the ETSI Standard.

The 5 GHz Radio Local Area Network (RLAN) Harmonized Standard document may describe details on the DFS process mandated for operation in 5 GHz spectrum in European Union countries. Based on this standard, different sets of DFS channels may have varying periods of CAC operation. Frequencies in the 5600-5650 MHz range, where TDWR (or other Meteorological Radar) operates, may require a minimum of 600 seconds of CAC scan time, while frequencies within 5250-5350 MHz range, 5470-5600 MHz range, and 5650-5725 MHz range may require a minimum of 60 seconds of CAC scan time.

Furthermore, as per ETSI EN 301 893, a master device shall only start operations on so called "available channels". At installation (or reinstallation) of the equipment, the RLAN is assumed to have no available channels within the band 5250 MHz to 5350 MHz and/or 5470 MHz to 5725 MHz. In such case, before starting operations on one or more of these channels, the master device shall perform either a CAC or an Off-Channel CAC to ensure that there are no radars operating on any of these channels. If no radar has been detected, the channel(s) becomes an available channel(s) and remains as such until a radar signal is detected during the in-service monitoring after the channel became an operating channel. The CAC or the Off-Channel CAC may be performed over a wider bandwidth such that all channels within the tested bandwidth become available channels. Based on above provisions under ETSI EN 301 893, technically an AP can extend its CAC validity window for infinite amount of time given it never hits radar during its operation or does not reboot. However, to provide maximum protection to radars, which may have been out of service when CAC was performed, a vendor may decide to limit CAC validity window, for example, to a maximum of 24 hours.

FIG. 1 shows an operating environment 100 for providing channel availability check optimization. As shown in FIG. 1, operating environment 100 may comprise a Wireless Local Area Network (WLAN) 105, a controller 110, and a radar source 115. WLAN 105 may comprise a first Access Point (AP) 120, a second AP 125, and a third AP 130. First AP 120, second AP 125, and third AP 130 may provide wireless network access (e.g., access to WLAN 105) for devices such as a station 135. Station 135 may comprise, but is not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. First AP 120, second AP 125, and third AP 130 may be compatible with specification standards such as the 802.11 ax specification standard for example.

Controller 110 may comprise a Wireless Local Area Network controller (WLC) and may provision and control WLAN 105. Controller 110 may allow first AP 120, second AP 125, and third AP 130 to join WLAN 105. In some embodiments of the disclosure, controller 110 may be implemented by a Digital Network Architecture Center (DNAC) controller (i.e., a Software-Defined Network (SDN) controller) that may configure information for WLAN 105 in order to provide channel availability check optimization consistent with embodiments of the disclosure.

Radar source 115 may comprise, but is not limited to, Terminal Doppler Weather Radar (TDWR). TDWR may comprise a Doppler weather radar system with a three-dimensional "pencil beam" used for the detection of hazardous wind shear conditions, precipitation, and winds aloft on and near airports situated in climates with exposure to thunderstorms. TDWR may use a carrier wave in the frequency band of 5600-5650 MHz (5 cm wavelength), with a narrow beam and angular resolution of 0.5 degree, and a peak power of conducted 250 kW. In reflectivity, the resolution in distance may comprise 150 meters within 135 kilometers of the radar and 300 meters from 135 kilometers to 460 kilometers to the radar.

The elements described above of operating environment 100 (e.g., controller 110, radar source 115, first AP 120, second AP 125, third AP 130, and station 135) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
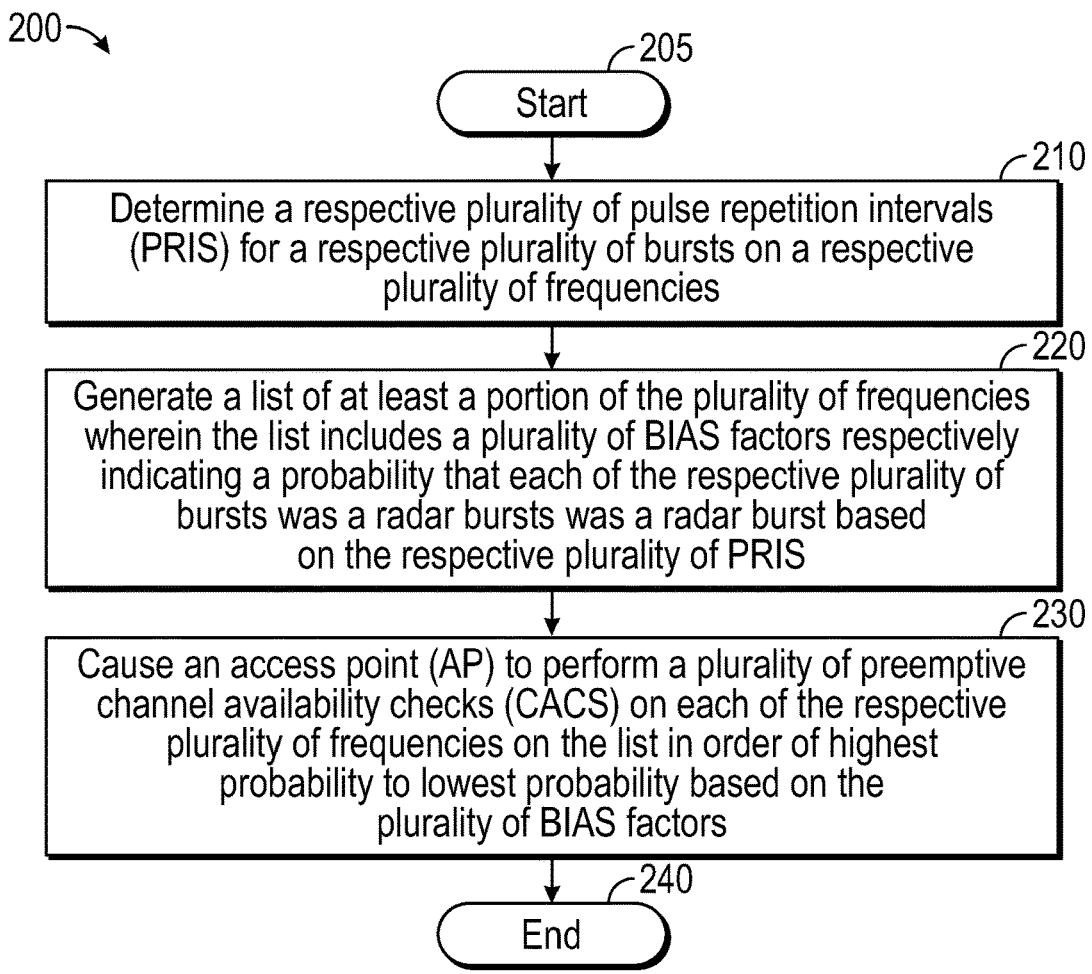
FIG. 2 is a flow chart of a method for providing channel availability check optimization.

FIG. 2 is a flow chart setting forth the general stages involved in a method 200 consistent with an embodiment of the invention for providing channel availability check optimization. Method 200 may be implemented using controller 110 or any of first AP 120, second AP 125, and third AP 130, any of which may be implemented using a computing device 500 as described in more detail below with respect to FIG. 5. Ways to implement the stages of method 200 will be described in greater detail below.

Figure 3:
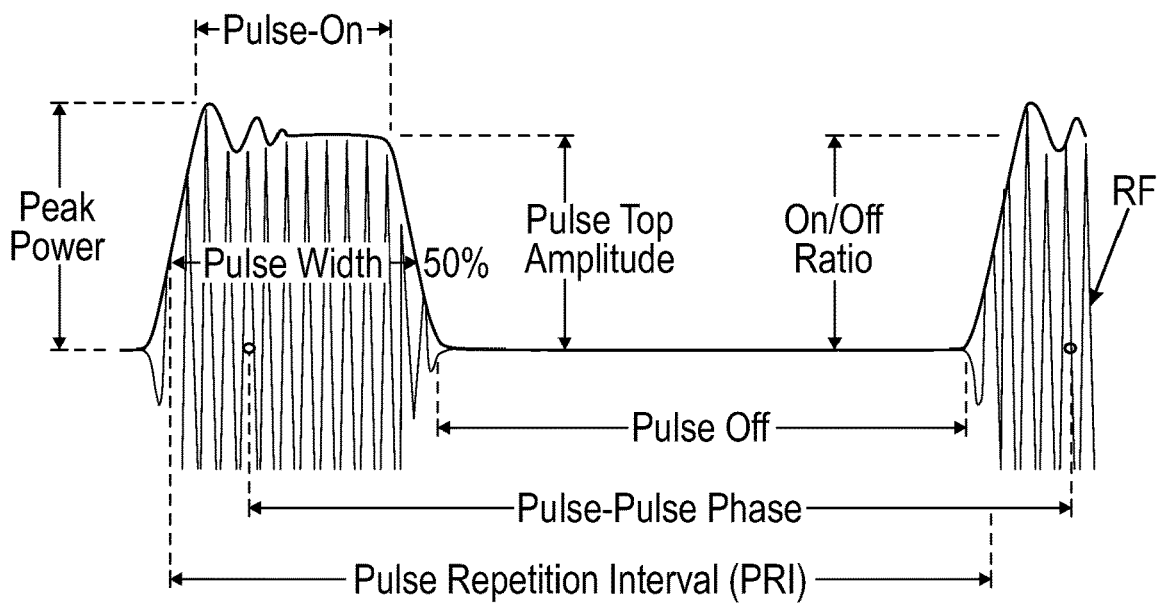
FIG. 3 illustrates a Pulse Repetition Interval (PRI)

Method 200 may begin at starting block 205 and proceed to stage 210 where controller 110 may determine a respective plurality of Pulse Repetition Intervals (PRIs) for a respective plurality of bursts on a respective plurality of frequencies. For example, the aforementioned ICAE may employ a radar duration classifier in order to compute the PRI on the set of frequencies prone to radar. The classifier may identify various attributes of the detected pulse at first AP 120 for example. These estimations for pulse duration may then be sent to controller 110 (e.g., on-premise at an AP, at a WLC, or on a cloud DNAC) for analysis. Controller 110 may also gather this telemetry from multiple neighboring radios (e.g., in second AP 125 and third AP 130) in order to estimate the duration of the radar pulse on a given frequency. As illustrated by FIG. 3, PRI may comprise a time interval between two consecutive pulses. PRI may be calculated, for example, based on some or all of the following factors: i) Pulse impacting frequency (Primary Channel, Extension/Secondary Channels); ii) Pulse On-Period (duration of pulse); iii) Top Amplitude, iv) Pulse Width; v) Peak Power; vi) Pulse-Pulse Phase.

A variance in PRI may determine whether a conservative or aggressive pulse_lag_period may be needed. Using neighboring APs instead of a single AP for radar pattern definition may increase accuracy. Embodiments of the disclosure may record the pulse periodicity so as to preemptively avoid the affected channel at a predicted pulse time. Some radar installations may become active in a cyclic nature each hour, day or week, making their radar pattern seen by the AP predictable using basic Machine Learning (ML) techniques, such as Long Short-Term Memory (LSTM). TDWR (or other Meteorological Radar) may work continuously and may operate according to a fixed scanning scheme where the elevation changes every (or every few) rotation(s). At the lower elevations, radar signals may be detectable by the AP's DFS process. While the radar may operate continuously, at fixed periods within the scanning scheme, radar signals are received, which may be predictable.

Furthermore, in order to reduce standard deviation in the PRI, radio resources may be tuned to monitor TDWR frequencies with high dwells in order to estimate radar presence and its duration. APs with built-in monitor radios may tune a receiver to monitor the onset of these DFS frequencies for better estimation, which may result in reduction in the pulse_lag_period.

The classifier may provide assessment towards pulse duration on a given DFS frequency along with aggressive or conservative pulse_lag_period based on above analysis. For example, based on the multiple inputs from neighboring radios, if 5 GHz frequency 5620 observes a bursty pulse at Universal Time Coordinated (UTC) 1100 with for duration of 735 seconds, controller 110 may auto-tune a radio's frequency at UTC1055 for 750 seconds out of 5620 and may revert after the estimate period.

From stage 210, where controller 110 determines the respective plurality of PRIs for the respective plurality of bursts on the respective plurality of frequencies, method 200 may advance to stage 220 where controller 110 may generate a list of at least a portion of the plurality of frequencies. The list may include a plurality of bias factors respectively indicating a probability that each of the respective plurality of bursts was a radar burst based on the respective plurality of PRIs. For example, based on the classifier metrics, controller 110 may generate white-list frequencies that may be less likely to get impacted by radar based on the historical data. White-list frequencies may also include a set of channels where the classifier's confidence factor for PRI estimation is higher. Two tables may be generated to enlist and sort white-list frequencies. The first table (e.g., DFS_PRI_INFO_TABLE) may include DFS frequencies with estimated timestamps and PRI information. Priority of these frequencies may be determined by the second table (e.g., CAC_PRIORITY_SCAN_TABLE), which is illustrated by FIG. 4.

In order to increase confidence, neighboring radios with a built-in monitor role function may tune at the predicted pulse impacting frequency and its duration to increase (or decrease) the bias factor that would result in future predictions. In order to maximize the impact and benefits for CAC avoidance, TDWR frequencies requiring longer (e.g., 600 seconds) of CAC may be prioritized over other DFS frequencies requiring a smaller CAC window (e.g., 60 seconds). Similarly, a classifier estimated classifier bias factor along with an ephemeral pulse phase may also be taken into consideration. The bias factor may employ Reinforcement Learning (RL) to monitor and be adjusted based on the predictions versus actual outcome. Any frequencies with a bias factor below a predetermined value (e.g., 0.50 or lower) may be removed from the white-list frequencies in the table.

Furthermore, as radar pulses may come from different sources, the predictor may collect input from additional sources to correlate source information with the pulse prediction. For example, TDWR may aim at detecting a certain cloud shape at certain distance. Input from weather prediction sources/temperature/wind input sources may be combined with pulse pattern detection to increase the accuracy of the next pulse likelihood prediction.

The outcome of such a prediction may be that the affected channels may be re-integrated into the pool of usable channels. APs may switch to these channels without having to wait 600 contiguous seconds before immediate operation, while still respecting the DFS requirements.

Once controller 110 generates the list of at least the portion of the plurality of frequencies in stage 220, method 200 may continue to stage 230 where controller 110 may cause an AP (e.g., first AP 120) to perform a plurality of preemptive Channel Availability Checks (CACs) on each of the respective plurality of frequencies on the list in order of highest probability to lowest probability based on the plurality of bias factors. For example, based on the white-list frequencies, an AP (e.g., first AP 120) may either perform a full CAC at network downtime or may benefit from off-channel CAC during busy hours of operation. Network downtime may be identified as non-busy hours where client count may be low, or may be an AP's lowest TxUtil+RxUtil for a given day. The scheduler may perform a full CAC or off-channel CAC sequentially based on the white-list frequency priority table.

An off-channel CAC may be when first AP 120, while servicing station 135, switches to performing CAC on a channel on the list for a brief moment (e.g., 10 ms) and then switches back to servicing station 135. This brief moment may not be long enough to disrupt the service of station 135. First AP 120 may repeat this action until the brief moments spent on this channel from the list add up to time defined by the regulation (e.g., 60 second or 600 seconds). In conditions were adjacent frequencies have similar white-list priority, a wider channel CAC may be conducted to optimize total CAC duration.

Once an integrated radio completes a full CAC or an off-channel CAC on all the white-list frequencies, any 5 GHz radio integrated (i.e., with same antenna) may benefit from switching on DFS frequencies without performing CAC while still abiding with the DFS requirements.

Furthermore, measurements from DFS_PRI_INFO_TABLE may be fed into Radio Resource Management (RRM) Dynamic Channel Assignment to maximize validity of the CAC. For any DFS frequency with a known timestamp and pulse repetition interval, a temporary channel switch within that duration is conducted to avoid radar impact. These transitions may ensure validity of the previously conducted CAC may get maximized over the total allowed CAC validity window.

Similarly, DFS frequencies defined under CAC_PRIORITY_SCAN_TABLE with higher classifier bias and lower pulse length may be used by the radio as extension channels and during the PRI, the radio may transiently reduce channel bandwidth to avoid radar impact. During these transient switches, the radio may trigger an operating mode notification element to notify reduction in channel width to its stations.

In summary, leveraging the classifier to estimate pulse length and repetition interval on a set of DFS frequencies, an AP may estimate time and duration to avoid a particular frequency to maximize channel availability check window and therefore benefit from completely avoiding CAC requirements without compromising on the protection of radars. As the 6 GHz operation may be restricted in many other aspects, there may be a desire for the 5 GHz operation to expand to the largest set of available channels.

Embodiments of the disclosure may provide a ICAE that may maximize validity of the preemptive CAC within its boundaries enlisted by the ETSI Standard and thus allow seamless channel changes on the DFS frequencies with little disruption to the wireless stations. With more than 75% of 5 MHz frequencies falling under DFS regulations in Europe for example, embodiments of the disclosure may present processes to allow outdoor operations in European domains. After controller 110 causes the AP (e.g., first AP 120) to perform the plurality of preemptive CACs on each of the respective plurality of frequencies on the list in order of highest probability to lowest probability based on the plurality of bias factors in stage 230, method 200 may then end at stage 240.

While the above examples may be described in terms of CAC for DFS in the 5 GHz for radar detection, embodiments of the disclosure are not limited to this. Embodiments of the disclosure may also be applied to other frequencies and scenarios where there is an incumbent, and where the WiFi system may need to spend some time validating that the incumbent is not transmitting, and vacate the channel if the incumbent is detected. For example, there may be incumbents in other frequency ranges (e.g., 6 GHz or other frequencies in which WiFi operations may be allowed) where a regulatory domain may mandate a CAC process or similar process.

Figure 5:
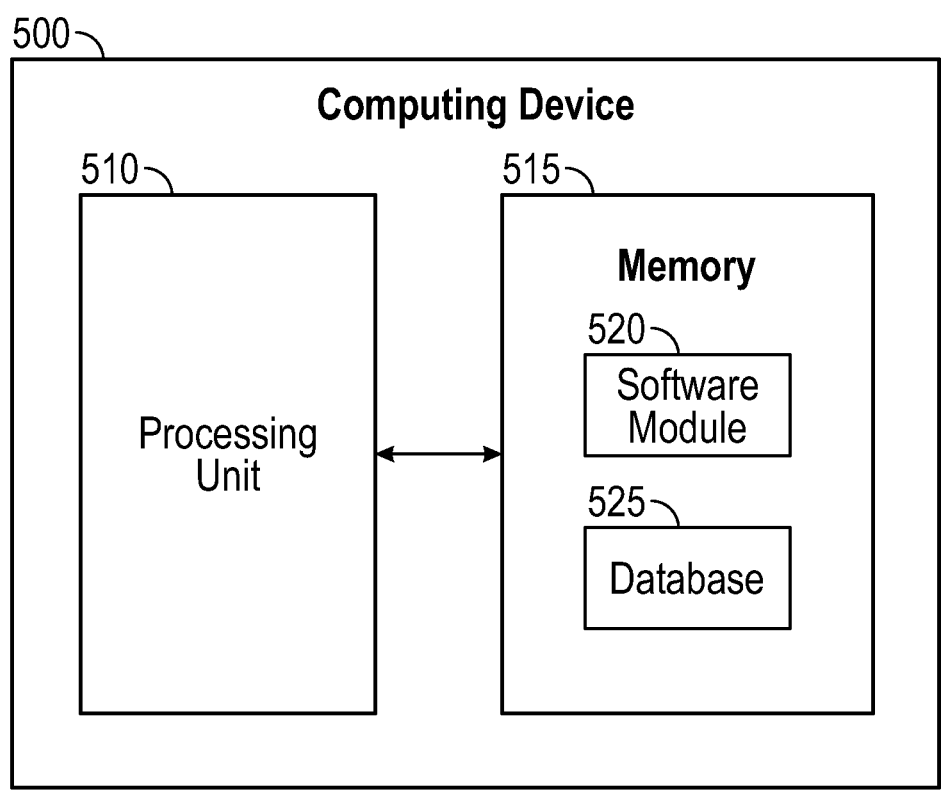
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing channel availability check optimization as described above with respect to FIG. 2. Computing device 500, for example, may provide an operating environment for controller 110, radar source 115, first AP 120, second AP 125, third AP 130, and station 135. Controller 110, radar source 115, first AP 120, second AP 125, third AP 130, and station 135 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining a plurality of Pulse Repetition Intervals (PRIs) for a respective plurality of bursts on a respective plurality of frequencies;
   generating a list of at least a portion of the plurality of frequencies wherein the list includes a plurality of bias factors respectively indicating a probability that each of the respective plurality of bursts was a radar burst based on the respective plurality of PRIs; and
   causing an Access Point (AP) to perform a plurality of preemptive Channel Availability Checks (CACs) on each of the respective plurality of frequencies on the list in order of highest probability to lowest probability based on the plurality of bias factors.

2. The method of claim 1, wherein generating the list comprises generating the list wherein only the plurality of frequencies having bias factors greater than a predetermined value are included on the list.

3. The method of claim 1, wherein causing the AP to perform the plurality of preemptive CACs comprises causing the AP to perform a CAC on adjacent frequencies when the bias factors of the adjacent frequencies are similar.

4. The method of claim 1, wherein causing the AP to perform the plurality of preemptive CACs comprises causing the AP to perform the plurality of preemptive CACs comprising full CACs.

5. The method of claim 1, wherein causing the AP to perform the plurality of preemptive CACs comprises causing the AP to perform the plurality of preemptive CACs comprising off-channel CACs.

6. The method of claim 1, further comprising placing frequencies requiring longer CAC times higher on the list than frequencies requiring shorter CAC times.

7. The method of claim 1, further comprising using information from neighboring radios to one of increase one of the plurality of bias factors and decrease one of the plurality of bias factors.

8. A system comprising:
   a memory storage; and
   a processing unit, the processing unit coupled to the memory storage, wherein the processing unit is operative to:
   determine a plurality of Pulse Repetition Intervals (PRIs) for a respective plurality of bursts on a respective plurality of frequencies;
   generate a list of at least a portion of the plurality of frequencies wherein the list includes a plurality of bias factors respectively indicating a probability that each of the respective plurality of bursts was a radar burst based on the respective plurality of PRIs; and
   cause a plurality of preemptive Channel Availability Checks (CACs) on each of the respective plurality of frequencies on the list in order of highest probability to lowest probability based on the plurality of bias factors.

9. The system of claim 8, wherein only the plurality of frequencies having bias factors greater than a predetermined value are included on the list.

10. The system of claim 8, wherein the processing unit being operative to cause the plurality of preemptive CACs comprises the processing unit being operative to cause a CAC on adjacent frequencies when the bias factors of the adjacent frequencies are similar.

11. The system of claim 8, wherein the processing unit being operative to cause the plurality of preemptive CACs comprises the processing unit being operative to cause the plurality of preemptive CACs comprising full CACs and the plurality of preemptive CACs comprising off-channel CACs.

12. The system of claim 8, wherein the processing unit is further operative to place frequencies requiring longer CAC times higher on the list than frequencies requiring shorter CAC times.

13. The system of claim 8, wherein the processing unit is further operative to use information from neighboring radios to one of increase one of the plurality of bias factors and decrease one of the plurality of bias factors.

14. A non-transitory computer-readable medium that stores a set of instructions which when executed perform a method executed by the set of instructions comprising:
   determining a plurality of Pulse Repetition Intervals (PRIs) for a respective plurality of bursts on a respective plurality of frequencies;
   generating a list of at least a portion of the plurality of frequencies wherein the list includes a plurality of bias factors respectively indicating a probability that each of the respective plurality of bursts was a radar burst based on the respective plurality of PRIs; and
   causing an Access Point (AP) to perform a plurality of preemptive Channel Availability Checks (CACs) on each of the respective plurality of frequencies on the list in order of highest probability to lowest probability based on the plurality of bias factors.

15. The non-transitory computer-readable medium of claim 14, wherein generating the list comprises generating the list wherein only the plurality of frequencies having bias factors greater than a predetermined value are included on the list.

16. The non-transitory computer-readable medium of claim 14, wherein causing the AP to perform the plurality of preemptive CACs comprises causing the AP to perform a CAC on adjacent frequencies when the bias factors of the adjacent frequencies are similar.

17. The non-transitory computer-readable medium of claim 14, wherein causing the AP to perform the plurality of preemptive CACs comprises causing the AP to perform the plurality of preemptive CACs comprising full CACs.

18. The non-transitory computer-readable medium of claim 14, wherein causing the AP to perform the plurality of preemptive CACs comprises causing the AP to perform the plurality of preemptive CACs comprising off-channel CACs.

19. The non-transitory computer-readable medium of claim 14, further comprising placing frequencies requiring longer CAC times higher on the list than frequencies requiring shorter CAC times.

20. The non-transitory computer-readable medium of claim 14, further comprising using information from neighboring radios to one of increase one of the plurality of bias factors and decrease one of the plurality of bias factors.

* * * * *